US 6,261,657 B1

(12) United States Patent
Ainsworth et al.

(10) Patent No.: US 6,261,657 B1
(45) Date of Patent: Jul. 17, 2001

(54) HOSE CONSTRUCTION CONTAINING FLUOROPLASTIC TERPOLYMERS

(75) Inventors: Carol Lynn Ainsworth; Brian Henry, both of Sun Prairie, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/299,297

(22) Filed: Apr. 26, 1999

(51) Int. Cl.[7] .......................... B29D 22/00; B32B 27/00; B32B 27/08; F16L 9/14; F16L 9/00
(52) U.S. Cl. ................. 428/36.91; 428/35.7; 428/421; 428/475.5; 428/480; 138/141; 138/153; 138/172
(58) Field of Search .................. 428/36.91, 36.9, 428/35.7, 421, 422, 480, 475.5; 138/137, 118, 141, 153, 172

(56) References Cited

U.S. PATENT DOCUMENTS 5,588,469 * 12/1996 Kakiuchi et al. ............... 138/137

* cited by examiner

Primary Examiner—Harold Pyon
Assistant Examiner—Michael C. Miggins
(74) Attorney, Agent, or Firm—Bruce J Hendricks

(57) ABSTRACT

The present invention relates to a hose construction containing a fluoroplastic barrier and a hydrogenated acrylonitrile-butadiene rubber layer. The hose comprises (1) a rubber layer comprising (a) hydrogenated acrylonitrile-butadiene rubber; (b) from 2 to 15 phr of an organophosphonium salt; (c) from 5 to 30 phr of trioctyl trimellitate; and (d) from 5 to 30 phr of a dialkyl diether glutarate; (2) a barrier layer comprised of a terpolymer derived from tetrafluoroethylene, hexafluoropropylene and vinylidene fluoride, wherein the barrier layer is directly adhered to the rubber layer.

26 Claims, 1 Drawing Sheet

HOSE CONSTRUCTION CONTAINING FLUOROPLASTIC TERPOLYMERS

BACKGROUND OF THE INVENTION

A major proportion of fuel hose presently employed in automobile applications is a multi-layered structure. The innermost tubular layer of the hose is formed of an elastomeric material intended to keep the fluid in the hose. Located between the inner core and the outer elastomeric cover is a barrier layer. In other fuel hoses, the barrier layer is the innermost tubular layer (known as a veneer hose), with the elastomeric material being located outside of such barrier layer. Many barrier layers have been used; however, many such compounds used in the barrier do not adhere to the conventional elastomeric material used in the innermost tubular layer. As a result of this problem, those skilled in the art conventionally use a layer between the inner core and the barrier layer which is both compatible to the elastomer used in the inner core and the barrier layer. Use of these "compatible" layers further adds to the cost and the resulting diameters of these fuel hose applications.

SUMMARY OF THE INVENTION

There is disclosed a hose comprising (1) a rubber layer comprising (a) hydrogenated acrylonitrile butadiene rubber and (b) from 2 to 15 phr of an organophosphonium salt; (c) from 5 to 30 phr of trioctyl trimellitate; and (d) from 5 to 30 phr of a dialkyl diether glutarate; and (2) a barrier layer comprised of a terpolymer derived from tetrafluoroethylene, hexafluoropropylene and vinylidene fluoride, wherein said barrier layer is directly adhered to said rubber.

DETAILED DESCRIPTION OF THE INVENTION

Figure 1:
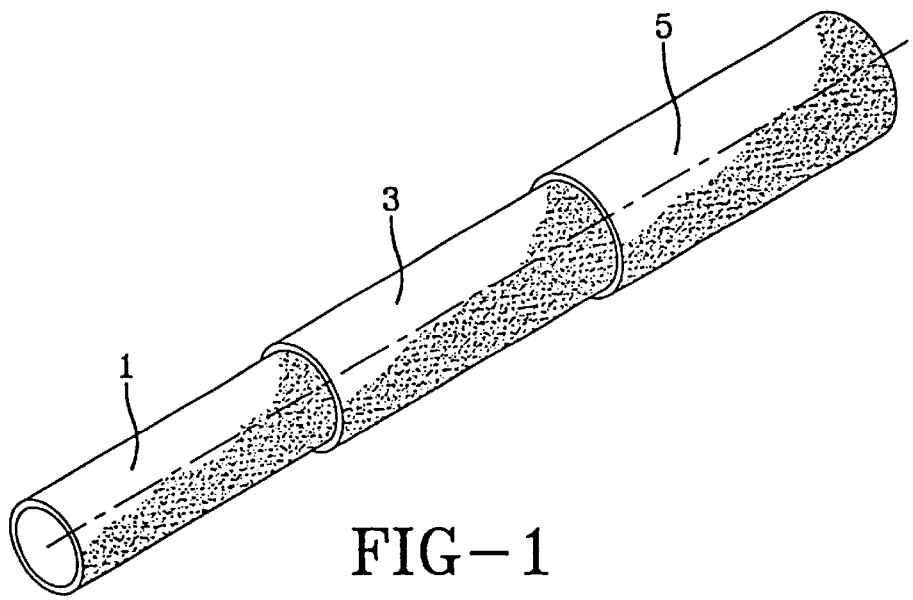
FIG. 1 is a perspective view of a hose according to the invention.

When a hose, for example, as shown in FIG. 1 is produced, the inner core (1) or tubular core of the present invention may be formed from hydrogenated acrylonitrile butadiene (NBR) rubber. An embodiment where the inner core (1) is a barrier layer and the second layer 3 is of the hydrogenated NBR composition that is directly adhered thereto will be described later.

Various hydrogenated acrylonitrile butadiene rubbers may be used. For example, the Mooney viscosity (M/L 1+4 @ 100° C.) and the acrylonitrile content may vary depending on the use of the hose. Suitable examples of hydrogenated acrylonitrile butadiene rubber may have a Mooney viscosity as low as 60 to as high as 120. The acrylonitrile content may range from as low as 15 percent to as high as 60 percent. The residual double bonds may range from 0 to 20 percent. Representative acrylonitrile rubbers that are commercially available from Nippon Zeon Company include a family of products marketed under the Zetpol™ line, such as Zetpol™ 1020 (Mooney 78 and acrylonitrile content 45 percent), Zetpol™ 2010 (Mooney 85 and acrylonitrile content 37 percent) and Zetpol™ 2020 (Mooney 78 and acrylonitrile content 37 percent). Another family of commercially available hydrogenated acrylonitrile-butadiene rubbers are marketed under the designation Therban™ by Bayer. Representative examples of various grades of the Therban™ line include Therban™ C 3446 (acrylonitrile content 34 wt %, 58 Mooney viscosity and 4 percent residual double bonds), Therban™ C 3467 (acrylonitrile content 34 percent, 68 Mooney viscosity, 5.5 percent residual double bonds), Therban™ B 3850 (acrylonitrile content 36 percent, 87 Mooney viscosity and 2 percent residual double bonds), Therban™ 534B (acrylonitrile content 36 percent, 66 Mooney viscosity, 2 percent residual double bonds), Therban™ C 4550 (acrylonitrile content 43 percent, 95 Mooney viscosity and 5.5 percent residual double bonds) and Therban™ XIV 532C (acrylonitrile content 43 percent, 70 Mooney viscosity and 5.5 percent residual double bonds).

Uniformly dispersed within the hydrogenated acrylonitrile-butadiene rubber is an organophosphonium salt. The organophosphonium salts include quaternary phosphonium salts containing an alkyl substituted group having 1 to 20 carbon atoms and quaternary phosphonium salts containing an aromatic substituent group, such as tetrabutylphosphonium chloride, allyltributylphosphonium chloride, tetrabutylphosphonium bromide, tributyl (methoxypropyl) phosphonium chloride, benzyltriphenylphosphonium chloride, benzyltrioctylphosphonium chloride, tetraalkylphosphonium benzotriazole (tetrabutylphosphonium benzotriazole, trioctylethylphosphonium benzotriazole), etc. One example of an organophosphonium salt is sold under the designation Dynamar™ FX-5166 and produced by 3M and composed mainly of allyltributyl phosphonium chloride.

The organophosphonium salt may be present in a range of amounts. Generally speaking, the amount of the organophosphonium salt will range from 2 to 15 phr (parts by weight per 100 parts by weight of rubber). Preferably, the organophosphonium salt will be present in an amount ranging from 4 to 8 phr.

Also uniformly dispersed within the hydrogenated acrylonitrile-butadiene rubber is trioctyl trimellitate. The trioctyl trimellitate is generally present in an amount ranging from about 5 to 30 phr. Preferably, the trioctyl trimellitate is present in an amount ranging from about 7 to 15 phr. An example of a commercially available source of trioctyl trimellitate is sold under the designation PLASTHALL® TOTM by The C P Hall Company.

The hydrogenated acrylonitrile butadiene also contains a dialkyl diether glutarate. Representative examples are of the formula

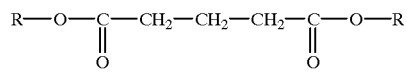

wherein R is selected from the group consisting of alkyl ether groups containing from 8 to 18 carbon atoms. An example of a commercially available source of such a dialkyl diether glutarate is sold under the designation PLASTHALL® 7050.

The dialkyl diether glutarate may be present in the hydrogenated acrylonitrile-butadiene rubber in an amount ranging from 5 to 30 phr. Preferably, the dialkyl diether glutarate is present in an amount ranging from about 7 to 15 phr.

In addition to the above, the hydrogenated NBR rubber composition may contain conventional additives including reinforcing agents, fillers, peptizing agents, pigments, stearic acid, accelerators, sulfur vulcanizing agents, antiozonants, antioxidants, processing oils, activators, initiators, plasticizers, waxes, prevulcanization inhibitors, extender oils and the like. Representative of reinforcing agents include carbon black, which is typically added in amounts ranging from about 5 to 200 parts by weight based on 100 parts by weight of total rubber (phr). Preferably, carbon black is used in amounts ranging from about 35 to 120 phr. Typical carbon blacks that are used include N110, N330, N332, N472, N550, N630, N642, N650, N762, N770, N907, N908, N990 and N991. It has been observed that increased levels of carbon black and, in particular, carbon black having a large particle size further improves adhesion of the rubber layer to the barrier layer. For example, the preferred carbon blacks have an average particle size of from 30 to 500 nm. The most preferred carbon blacks have a particle size of from 200 to 500 nm. In those instances, when the hose will be used to convey flammable fluids, electrically conductive blacks may be used. Noncarbon black fillers which may be used include talc, clay, calcium carbonate, silica and the like. Noncarbon black fillers may be used in an amount ranging from about 5 to 150 phr. However, it has been found that the presence of such fillers may be detrimental to adhesion and/or bleeding of hose components. Therefore, in a preferred embodiment, the rubber layer does not contain noncarbon black fillers. Oil dispersions containing such fillers may also be used. Organosilanes such as 3,3'bis(triethoxysilylpropyl) tetrasulfide may be used in amounts ranging from 0.1 to 20 phr. Suitable examples of such organosilanes are disclosed in U.S. Pat. No. 4,128,438 incorporated herein by reference in its entirety. Representative of the antidegradants which may be in the rubber composition include microcrystalline wax, paraffinic wax, monophenols, bisphenols, thiobisphenols, polyphenols, hydroquinone derivatives, phosphites, phosphate blends, thioesters, naphthylamines, diphenol amines, substituted and unsubstituted diaryl amine derivatives, diarylphenylenediames, para-phenylene diamines, quinolines and blended amines. Antidegradants are generally used in an amount ranging from about 0.1 phr to about 10 phr with a range of from about 2 to 6 phr being preferred. Representative of a peptizing agent that may be used is pentachlorophenol which may be used in an amount ranging from about 0.1 phr to 0.4 phr with a range of from about 0.2 to 0.3 phr being preferred. Representative of processing oils which may be used in the rubber composition of the present invention include activated dithio-bisbenzanilide, poly-para-dinitrosobenzene, xylyl mercaptans, aliphatic-naphthenic aromatic resins, polyethylene glycol, petroleum oils, ester plasticizers, vulcanized vegetable oils, pine tar, phenolic resins, synthetic oils, petroleum resins, polymeric esters and rosins. These processing oils may be used in a conventional amount ranging from about 0 to about 140 phr. Representative of an initiators that may be used is stearic acid. Initiators are generally used in a conventional amount ranging from about 1 to 4 phr. Additional additives which may be used as part of the cure package include calcium oxide and zinc oxide. The rubber layer may contain magnesium dioxide in conventional amounts. However, it has been found that the presence of magnesium oxide in the rubber layer may be detrimental to adhesion and/or bleeding of the hose components. Therefore, in a preferred embodiment, the rubber layer does not contain magnesium oxide. These additives are conventionally used in amounts ranging from 0.1 to 25 phr.

The elastomeric compositions for use in the coating layer can be crosslinked by various peroxide containing curing agents. Curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as α,α'-bis(t-butylperoxy)-isopropylbenzene, 2,5-Dimethyl-2,5-di(t-butylperoxy) hexane, Di-t-butyl peroxide, 2,5-Dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane and benzoyl peroxide. All of the above curing agents are commercially available.

The amount of curing agent that is used may vary. Generally speaking, the level will range of from 0.1 to 10 phr (based on active parts of peroxide). Preferably, the level ranges from 1.8 to 3.0 phr.

Minor amounts of the zinc salt unsaturated carboxylic acid ester grafted hydrogenated nitrile butadiene elastomer may be substituted with conventional hydrogenated acrylonitrile butadiene rubbers. For example, from 0 to 30 parts by weight of the total 100 parts by weight of the composition may be HNBR.

Crosslinking coagents may be added to the rubber composition. Representative examples of such coagents include triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-, tri-, tetra- and penta-functional methacrylates, n,n'-m-phenylene-dimaleimide, 1,2-cis-polybutadiene and mixtures thereof. Typical amounts of such coagents range from 1 to 20 phr. Preferred ranges of coagents include of from 2 to 10 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition is generally carried out at conventional temperatures ranging from about 160° C. to 190° C. Preferably, the curing is conducted at temperatures ranging from about 170° C. to 180° C.

Referring to FIG. 1, the inner core 1 may be of the above-described hydrogenated NBR with the barrier layer 3 directly adhered thereto.

In accordance with another embodiment, the barrier layer 1 may be the inner core with a rubber layer 3 of the hydrogenated NBR composition directly adhered thereto.

The layer of hydrogenated NBR layer may be formed by extrusion methods known to those skilled in the art. The thickness of this layer whether the inner core 1 or next layer 3 core 1 is important as excessively thin wall thicknesses or excessively thick wall thicknesses present flexibility or kinking problems or coupling compatibility problems of the final hose composite. It is believed that the inside diameter of the inner core (1) whether made from the hydrogenated NBR or barrier layer should range from 3 mm to 100 mm. Preferably, the inside diameter of the inner core will range from 4 mm to 75 mm. When the inner core is made from the hydrogenated NBR, the wall thicknesses of the inner core (1) should range from 0.1 mm to 8.0 mm, with a range of from 0.5 mm to 4.0 mm being preferred. When the inner core is made from the barrier layer compound, the wall thicknesses of the inner core (1) should range from 0.02 to 0.76 mm.

One advantage of the present invention is that the layer of hydrogenated NBR may be directly adhered to the barrier layer used in the present invention. Accordingly, no "compatible" polymeric layer need be present between the inner core (1) and the barrier layer (3) of the present invention.

The barrier layer (1) or (3) used in the present invention is derived from a terpolymer derived from tetrafluoroethylene, hexafluoropropylene and vinylidene fluoride. The thickness of this barrier layer (3) is important, as excessively thin wall thicknesses or excessively thick wall thicknesses present flexibility or kinking problems or desired barrier properties. Generally speaking, the thickness of the barrier layer (3) will range from about 0.02 mm to about 0.76 mm with a range of from about 0.12 mm to 0.25 mm being preferred. The preferred terpolymers which may be used to form the barrier layer (3) of the hose of the present invention are commercially available from the 3M Company under the commercial designations THV 200, THV 300, THV 400 and THV 500. THV 500 has a melting range of from 165 to 180° C., a melt flow index of 5–15 (265° C./5 kilogram) as determined by ASTM 1238, a specific gravity of 1.98 grams per centimeter according to ASTM 792, a tensile of 20 N/square meters according to ASTM 638 and an elongation of 450 percent according to ASTM 638.

The last element required in the hose of the present invention is an outer cover (5). This outer cover may be made from an elastomeric material or reinforcement. Examples of reinforcement include spiralled yarn, knitted yarn and braided yarn. Yarns of polyester, nylon, rayon and aramid may be used. When an elastomeric cover is desired, the cover (5) may be extruded over the underlying layer 3, or, as discussed below, various other optional layers. The elastomers which may be used to form the cover for the hose of the present invention include those known to those skilled in the art such as chlorosulfonated polyethylene, chlorinated polyethylene, acrylonitrile-butadiene rubber/PVC blends, epichlorohydrin, EPDM, chloroprene, EVA, ethylene acrylic elastomer "EA" and EVM. Preferably, the elastomer used in the cover is chlorinated polyethylene or a NBR/PVC blend. The thickness of the elastomeric cover (5) is obviously depends upon the desired properties of the hose and the elastomer that is used. Generally speaking, the thickness of the elastomeric cover (5) will range from about 0.1 mm to about 10 mm, with a range of from 0.5 mm to being 2.5 mm being preferred.

Figure 2:
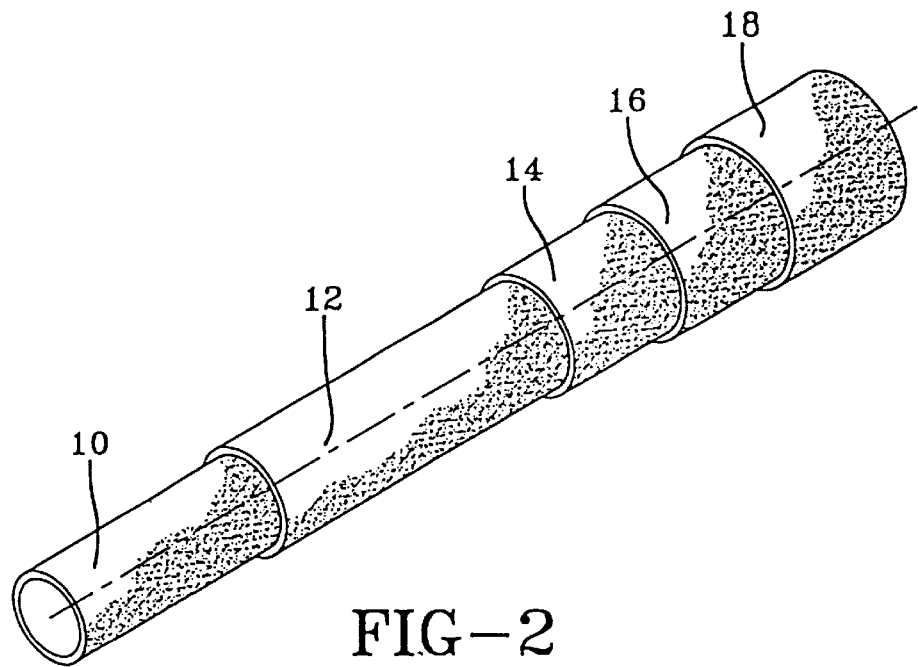
FIG. 2 is a perspective view of a hose according to the invention.

Whereas the three basic layers have been discussed above as essential to the present invention, the hose of the present invention may have optional features. For example, when a hose, as shown in FIG. 2, is produced having the inner core (10) and barrier layer (12), dispersed on the outside of the barrier layer (12) may be a first layer (14) of another polymer. Such polymer may be of the same composition as the inner core. In another embodiment, the polymer which is used in this first layer (14), which interfaces the barrier layer (12), may be epichlorohydrin. The thickness of this first layer (14) which interfaces the barrier layer (12) may range depending upon the polymer selected. Generally speaking, the thickness of this layer will range of from about 0.25 mm to about 1.5 mm with a range of from about 0.50 mm to about 1.0 mm being preferred.

Another optional feature of the present invention is reinforcement (16) may be added on top of the first layer (14) which interfaces with the barrier layer (12). Such reinforcement (16) is known to those skilled in the art and may consist of spiraled, knitted or braided yarn. Such reinforcements are typically derived from polyester, nylon, rayon or aramid cords. The reinforcement (16) is preferably spirally wound about the first layer under sufficient tension to improve the strength of the hose structure. The reinforcement layer (16) is preferably spirally wrapped at angles such that the flexing of the hose will not result in collapse or kinking. An angle such as from 0 to 89.9° with respect to the centerline of the hose may be used. Most preferably, a neutral angle of 54° 73' or below is used for the spiral wraps.

In accordance with one embodiment, the inner core 10 functions as a barrier layer comprised of the above-described terpolymer, the next layer 12 is made of the hydrogenated acrylonitrile-butadiene rubber, the next layer 14 is omitted, with reinforcement 16 being directly against the rubber layer 12 followed by an outer cover 18.

As mentioned above, the elastomeric cover (18) is the outside layer.

The following examples are provided to illustrate the instant invention and are not intended to limit the same. All parts are parts by weight, unless listed otherwise.

EXAMPLE 1

In order to demonstrate the advantages of the present invention, a hose construction was prepared. The hose construction comprised an inner core of a hydrogenated NBR compound. The recipe for the hydrogenated NBR compound may be found in Table I below.

The hydrogenated NBR inner core tube was extruded onto a mandrel using a Davis-Standard cross-head 3.5 inch (8.89 cm) diameter 20:1 L/D rubber extruder with temperature profile as shown in Table I. The tube was extruded to 0.275 inch (0.70 cm) ID by 0.035 inch (0.09 mm) wall using a 0.318 inch (0.808 cm) OD inner die and a 0.365 inch (0.927 cm) ID outer die. The screw was running at approximately 3.5 RPM to produce a line speed of 60–80 feet per minute (18.3 to 24.4 meters per minute). The extrudate was cooled with water spray and the excess water removed by a forced air blow-off device.

The hydrogenated NBR extrudate was pulled through a Davis-Standard cross-head mounted on a Sterling 3 inch (7.62 cm) diameter plastic extruder with a 24:1 L/D. A THV 500 barrier layer was extruded using the temperature profile shown in Table I through a 0.875 inch (2.22 cm) OD inner die and a 1.40 inch (3.15 cm) ID outer die and drawn onto the tube. The plastic extruder was run at 8.2 RPM with a line speed of 60 to 80 feet per minute (18.3 to 24.4 meters per minute). The THV 500 barrier was drawn down to 0.008 inch (0.2 mm) thick and water-cooled on the tube.

The tube and barrier were pulled through a Davis-Standard cross-head mounted on a 3.5 inch (8.89 cm)

diameter rubber extruder with a 12:1 L/D with temperature profile shown in Table II. A 0.035 inch (0.89 mm) gage hydrogenated NBR friction layer (same composition as used in inner core) was applied over the THV 500 layer with the aid of vacuum. A 0.380 inch (0.965 cm) OD tapered inner die and a 0.44 inch (1.118 cm) ID tapered outer die were used to produce the extrudate. The extruder was run with a speed setting of 7.5 and a line speed of 70 feet per minute (21.3 meters per minute). Water spray was used to cool the extrudate. Excess water was removed by a forced air blow-off device.

The extruded layers were pulled through a spiral reinforcement applicator. Aramid reinforcement yarn (1000 denier) was applied by spiralling 12 carriers clockwise and 12 carriers counterclockwise using a lead of 0.890.

A 0.060 inch (1.52 mm) ethylene acrylic elastomer "EA" cover was applied by pulling the spiraled reinforced extrudate through a Davis-Standard cross-head attached to a 3.5 inch (8.89 cm) rubber extruder. The temperature profile for the extruder is shown in Table I. A 0.475 inch (1.21 cm) OD tapered inner die and a 1.575 inch (1.46 cm) ID tapered outer die were used to produce the extrudate. The cover was applied at 70 feet per minute (21.3 meters per minute). Water was sprayed on the hose to aid cooling. Excess water was removed with a forced air device. A lubricant was applied to inhibit hose sticking together.

A section of the hose was loaded onto a pan and steam-cured at 160–185° C.

After cure, the mandrel was removed from the hose and then cut to finished length.

TABLE I

| Ingredient | Parts by Weight |
| --- | --- |
| HNBR[1] | 100 |
| Organophosphonium Salt[2] | 6 |
| Trioctyl Trimellitate[3] | 10 |
| Dialkyl Diether Gluterate[4] | 10 |
| Carbon Black N550 | 55 |
| Carbon Black N990 | 45 |
| Antidegradant[5] | 1.1 |
| Zinc Oxide (85% by weight) | 5 |
| Peroxide[6] | 7 |
| Antidegradant[7] | 0.4 |
| Coagent[8] | 1.5 |

[1]Therban ™ 4550 obtained from Bayer
[2]Dynamar ™ FX-5166 obtained from 3M
[3]Plasthall ™ TOTM obtained from C P Hall
[4]Plasthall ™ C7050 obtained from C P Hall
[5]4,4'-di(dimethyl benzyl) diphenylamine
[6]α'-bis(t-butylperoxy) diisopropyl benzene
[7]zinc 2-mercaptotoluimidazole
[8]triallyl isocyanurate

EXAMPLE 2

In order to demonstrate the advantages of the present invention, a hose construction according to a second embodiment was prepared. The hose construction comprised an inner core of a barrier layer of a terpolymer derived from tetrafluoroethylene, hexafluoroethylene and vinylidine fluoride. Directly adhered to the inner core was a layer of the hydrogenated NBR compound found in Table I above.

The THV 500 inner core tube was extruded onto a mandrel using a 4.5 inch (11.43 cm) diameter 16:1 Davis-Standard cross-head mounted on a starting 3-inch (7.62 cm) diameter plastic extruder with a 24:1 L/D. The THV 500 barrier was extruded using the temperature profile shown in Table III. The tube was extruded to using a 0.875 inch (2.22 cm) OD inner die and a 1.40 inch (3.56 cm) ID outer die. The plastic extruder was run at 6.0 RPM with a line speed of 60 to 80 feet per minute (18.3 to 24.4 meters per minute). The THV 500 barrier was drawn down to 0.008 inch (0.2 mm) thick and water-cooled on the mandrel. Onto the barrier layer of hydrogenated NBR was extruded using a Davis-Standard cross-head 3.5 inch (8.89 cm) diameter 20:1 L/D rubber extruder and cross-head with temperature profile as shown in Table III. The tube was extruded through a 0.297 inch (0.75 cm) OD inner die and a 0.37 inch (0.94 cm) ID outer die. The screw was running at approximately 3.5 RPM to produce a line speed of 60–80 feet per minute (18.29 to 24.4 meters per minute). The extrudate was cooled with water spray and the excess water removed by a forced air blow-off device.

The extruded layers were pulled through a reinforcement applicator. Aramid reinforcement yarn (1000 denier) was applied by spiralling 12 carriers clockwise and 12 carriers counterclockwise using a lead of 0.84.

A 0.090-inch (2.29 mm) ethylene acrylic "EA" elastomer cover was applied by pulling the spiralled reinforced extrudate through a Davis-Standard cross-head attached to a 3.5 inch (8.89 cm) rubber extruder. The temperature profile for the extruder is shown in Table I. A 0.40 inch (1.02 cm) OD tapered inner die and a 0.575 inch (1.46 cm) ID tapered outer die were used to produce the extrudate. The cover was applied at 70 feet per minute (21.3 meters per minute). Water was sprayed on the hose to aid cooling. Excess water was removed with a forced air device. A lubricant was applied to inhibit hose sticking together. Then the hose was cut to length.

A section of the hose was loaded onto a pan and steam-cured at 160–185° C.

After cure, the mandrel was removed from the hose and then cut to finished length.

TABLE II

EXTRUDER TEMPERATURE PROFILES ° C.
BARREL ZONES

| Extruder | Matl | screw | transition | metering 1 | metering 2 | neck | head | die |
| --- | --- | --- | --- | --- | --- | --- | --- | --- |
| Tube | HNBR | 82 | 56 | 63 | 68 | N/A | 93 | N/A |
| Barrier | THV | N/A | 232 | 243 | 254 | 251 | 251 | 243 |
| Friction | HNBR | 82 | 66 | 63 | 68 | N/A | 93 | N/A |
| Cover | EA | 82 | 74 | 74 | 74 | N/A | 93 | N/A |

TABLE III

EXTRUDER TEMPERATURE PROFILES ° C.
BARREL ZONES

| Extruder | Matl | screw | transition | metering 1 | metering 2 | neck | head | die |
|---|---|---|---|---|---|---|---|---|
| Barrier Tube | THV | N/A | 232 | 243 | 254 | 251 | 251 | 243 |
| Rubber Layer | HNBR | 82 | 56 | 63 | 68 | N/A | 93 | N/A |
| Cover | EA | 82 | 74 | 74 | 74 | N/A | 93 | N/A |

EXAMPLE 3

In order to demonstrate the advantage of the present invention, a series of hydrogenated NBR samples were prepared. The recipes may be found in Table II below along with their respective properties. The original tensile and elongation properties were tested according to ASTM D412. The fluid agings were measured according to ASTM D471. The air agings were measured according to ASTM D573. Tear resistance was measured according to ASTM D624. The evaluation of bleeding of plasticizer was visually determined based on whether pen marks were permanent or not and whether there was a visual sheen to the sheet.

| | Smpl 1 Ctrl | Smpl 2 | Smpl 3 Ctrl | Smpl 4 | Smpl 5 Ctrl | Smpl 6 | Smpl 7 Ctrl | Smpl 8 | Smpl 9 Ctrl |
|---|---|---|---|---|---|---|---|---|---|
| HNBR[1] | 100.00 | 100.00 | 100.00 | 100.00 | 100.00 | 100.00 | 100.00 | 100.00 | |
| HNBR[2] | | | | | | | | | 100.00 |
| Carbon Black[3] | 55.00 | 55.00 | 55.00 | 55.00 | 55.00 | 55.00 | 55.00 | 55.00 | 55.00 |
| Carbon Black[4] | 45.00 | 45.00 | 24.00 | 24.00 | 45.00 | 45.00 | 24.00 | 24.00 | 45.00 |
| Silica[5] | | | 15.00 | 15.00 | | | 15.00 | 15.00 | |
| Trioctyl Trimellitate[6] | | 10.00 | | 10.00 | | 10.00 | | 10.00 | |
| Dialkyl Diether Glutarate[7] | | 10.00 | | 10.00 | | 10.00 | | 10.00 | |
| Dioctyl Sebacate | 10.00 | | 10.00 | | 10.00 | | 10.00 | | 10.00 |
| Di(butoxy-ethoxy-ethyl) adipate | 10.00 | | 10.00 | | 10.00 | | 10.00 | | 10.00 |
| Antidegradant[8] | 1.10 | 1.10 | 1.10 | 1.10 | 1.10 | 1.10 | 1.10 | 1.10 | 1.10 |
| Antidegradant[9] | 0.40 | 0.40 | 0.40 | 0.40 | 0.40 | 0.40 | 0.40 | 0.40 | 0.40 |
| MgO | | 15.00 | 15.00 | 15.00 | 15.00 | | | | 15.00 |
| Zinc Oxide (85%) | 5.00 | 5.00 | 5.00 | 5.00 | 5.00 | 5.00 | 5.00 | 5.00 | 5.00 |
| Organo-phosphonium Salt[10] | 4.00 | 4.00 | 4.00 | 4.00 | 4.00 | 4.00 | 4.00 | 4.00 | 4.00 |
| N,N-m-phenylene Dimaleimide | 1.50 | | | 1.50 | | 1.50 | 1.50 | | |
| Triallyl Isocyanurate | | 1.50 | 1.50 | | 1.50 | | | 1.50 | 1.50 |
| Peroxide[11] | 7.00 | 10.00 | 7.00 | 10.00 | 7.00 | 10.00 | 7.00 | 10.00 | 10.00 |
| Compression Set, 70 hrs @ 149° C. | | | | | | | | | |
| Set, % | 36.2 | 53.6 | 35.4 | 36.7 | 47.0 | 35.2 | 46.8 | 41.0 | 40.7 |
| Adhesion to THV | 0 | 19 | 28 | 0 | 19.6 | 18 | 0 | 0 | 39.2 |
| Bleeding | bleed | | bleed | | bleed | bleed | | | bleed |
| Adhesion Type @ RM | mylar-type | stock tear | stock tear | mylar-type | stock tear | stock tear | mylar-type | mylar-type | stock tear |
| Die C Tear, psi | 184 | 145 | 142 | 132 | 141 | 144 | 145 | 122 | 147 |
| Original Physicals @ 154° C. | | | | | | | | | |
| Tensile, psi | 2761 | 3050 | 2426 | 2904 | 2533 | 2843 | 2904 | 2917 | 2735 |
| Mod @ 100%, psi | 996 | 1634 | 871 | 1613 | 933 | 1763 | 1190 | 1805 | 1179 |
| Elongation, % | 272 | 191 | 237 | 175 | 231 | 163 | 211 | 145 | 215 |
| Hardness, pts | 70 | 77 | 74 | 78 | 72 | 78 | 75 | 80 | 74 |
| Heat Age, 240 hrs @ 149° C. | | | | | | | | | |
| Tensile, psi | 3317 | 2824 | 2810 | 2998 | 2731 | 3018 | | 3202 | 2818 |
| Elongation, % | 91 | 67 | 75 | 80 | 78 | 83 | | 73 | 107 |
| Hardness, pts | 91 | 90 | 91 | 90 | 92 | 90 | 90 | 92 | 90 |

-continued

| | | | | | | | | | |
|---|---|---|---|---|---|---|---|---|---|
| Fluid Resistance, 70 hrs @ 149° C. in IRM-903 | | | | | | | | | |
| Tensile, psi | 2780 | 2696 | 2009 | 2594 | 2229 | 2730 | 2323 | 2511 | 2561 |
| Elongation, % | 197 | 142 | 170 | 136 | 156 | 144 | 149 | 121 | 192 |
| Mod @ 100%, psi | 1435 | 1818 | 1070 | 1818 | 1352 | 1952 | 1380 | 1902 | 1332 |
| Hardness, pts | 80 | 80 | 82 | 83 | 81 | 81 | 80 | 83 | 80 |
| Volume Swell, % | −3 | −3 | −4 | −3 | −3 | −2 | −4 | −3 | −2 |
| Fluid Resistance, 70 hrs @ RT in Fuel C | | | | | | | | | |
| Tensile, psi | 2016 | 1871 | 1595 | 1885 | 1508 | 1871 | 1856 | 1653 | 1914 |
| Elongation, % | 185 | 110 | 175 | 125 | 150 | 115 | 150 | 100 | 155 |
| Mod @ 100%, psi | 740 | 1624 | 653 | 1305 | 769 | 1537 | 972 | 1653 | 1044 |
| Hardness, pts | 52 | 63 | 55 | 60 | 50 | 64 | 60 | 67 | 60 |
| Volume Swell, % | 37 | 28 | 28 | 28 | 35 | 28 | 23 | 25 | 29 |
| Weight Change, % | 25 | 18 | 17 | 17 | 21 | 17 | 14 | 16 | 17 |
| Fluid Resistance, 70 hrs @ RT in 85% Fuel C/15% MeOH | | | | | | | | | |
| Tensile, psi | 1523 | 1436 | 1204 | 1537 | 1146 | 1334 | 1146 | 1102 | 1523 |
| Elongation, % | 150 | 85 | 145 | 105 | 120 | 85 | 100 | 70 | 135 |
| Hardness, pts | 50 | 62 | 51 | 63 | 48 | 62 | 58 | 62 | 54 |
| Volume Swell, % | 48 | 44 | 47 | 43 | 47 | 44 | 45 | 44 | 48 |
| Weight Change, % | 30 | 27 | 28 | 25 | 29 | 26 | 28 | 27 | 29 |
| Fluid Resistance, 70 hrs @ RT in 75% Fuel C/25% MeOH | | | | | | | | | |
| Tensile, psi | 1334 | 1537 | 1146 | 1291 | 972 | 1465 | 1363 | 957 | 1479 |
| Elongation, % | 135 | 90 | 130 | 95 | 110 | 95 | 120 | 65 | 130 |
| Hardness, pts | 47 | 62 | 52 | 62 | 50 | 63 | 58 | 64 | 55 |
| Volume Swell, % | 50 | 44 | 52 | 50 | 53 | 49 | 50 | 46 | 45 |
| Weight Change, % | 31 | 27 | 32 | 30 | 33 | 30 | 30 | 28 | 26 |

| | Smpl 10 | Smpl 11 Ctrl | Smpl 12 | Smpl 13 Ctrl | Smpl 14 | Smpl 15 Ctrl | Smpl 16 |
|---|---|---|---|---|---|---|---|
| HNBR[2] | 100.00 | 100.00 | 100.00 | 100.00 | 100.00 | 100.00 | 100.00 |
| Carbon Black[3] | 55.00 | 55.00 | 55.00 | 55.00 | 55.00 | 55.00 | 55.00 |
| Carbon Black[4] | 45.00 | 24.00 | 24.00 | 45.00 | 45.00 | 24.00 | 24.00 |
| Silica[5] | | 15.00 | 15.00 | | | 15.00 | 15.00 |
| Trioctyl Trimellitate[6] | 10.00 | | 10.00 | | 10.00 | | 10.00 |
| Dialkyl Diether Gluterate[7] | 10.00 | | 10.00 | | 10.00 | | 10.00 |
| Dioctyl Sebacate | | 10.00 | | 10.00 | | 10.00 | |
| Di(butoxy-ethoxy-ethyl) Adipate | | 10.00 | | 10.00 | | 10.00 | |
| Antidegradant[8] | 1.10 | 1.10 | 1.10 | 1.10 | 1.10 | 1.10 | 1.10 |
| Antidegradant[9] | 0.40 | 0.40 | 0.40 | 0.40 | 0.40 | 0.40 | 0.40 |
| MgO | 15.00 | | | | | 15.00 | 15.00 |
| Zinc Oxide (85%) | 5.00 | 5.00 | 5.00 | 5.00 | 5.00 | 5.00 | 5.00 |
| Organophosphonium Salt[10] | 4.00 | 4.00 | 4.00 | 4.00 | 4.00 | 4.00 | 4.00 |
| N,N-m-phenylene Dimaleimide | 1.50 | 1.50 | | 1.50 | | | 1.50 |
| Triallyl Isocyanurate | | | 1.50 | | 1.50 | 1.50 | |
| Peroxide[11] | 7.00 | 10.00 | 7.00 | 10.00 | 7.00 | 10.00 | 7.00 |
| Compression Set, 70 hrs @ 149° C. | | | | | | | |
| Set, % | 46 | 55.3 | 51 | 32.3 | 39.8 | 42.8 | 51.7 |
| Adhesion to THV | 35.1 | 0 | 0 | 0 | 71.7 | 42.1 | 43.5 |
| Bleeding | bleed | | | bleed | | bleed | bleed |
| Adhesion Type @ RM | stock tear | mylar-type | mylar-type | mylar-type | stock tear | stock tear | mylar-type surface |
| Die C Tear, psi | 199 | 178 | 172 | 172 | 186 | 139 | 205 |
| Original Physicals @ 154° C. | | | | | | | |
| Tensile, psi | 2661 | 3059 | 2874 | 2970 | 2875 | 2735 | 2601 |
| Mod @ 100%, psi | 917 | 1316 | 1013 | 1157 | 1060 | 1071 | 763 |
| Mod @ 200%, psi | 2075 | 2767 | 2446 | 2718 | 2507 | | 1879 |
| Elongation, % | 298 | 242 | 262 | 254 | 270 | 225 | 341 |
| Hardness, pts | 73 | 81 | 77 | 73 | 73 | 73 | 73 |

-continued

| | | | | | | | |
|---|---|---|---|---|---|---|---|
| Heat Age, 240 hrs @ 149° C. | | | | | | | |
| Tensile, psi | 2756 | 3567 | 3129 | 3326 | 3026 | 3125 | 3067 |
| Elongation, % | 155 | 91 | 127 | 127 | 148 | 105 | 146 |
| Mod @ 100%, psi | 2361 | | 2787 | 2926 | 2478 | 3040 | 2569 |
| Hardness, pts | 88 | 91 | 90 | 90 | 88 | 90 | 90 |
| Fluid Resistance, 70 hrs @ 149° C. in IRM-903 | | | | | | | |
| Tensile, psi | 2433 | 3193 | 2734 | 2750 | 2490 | 2737 | 2581 |
| Elongation, % | 244 | 197 | 218 | 227 | 198 | 207 | 301 |
| Mod @ 100%, psi | 1067 | 1688 | 1159 | 1343 | 1132 | 1315 | 917 |
| Mod @ 200%, psi | 2151 | 3103 | 2537 | 2887 | 2557 | 2661 | 2031 |
| Hardness, pts | 88 | 88 | 82 | 79 | 78 | 83 | 79 |
| Volume Swell, % | −4 | −2 | −2 | −3 | −3 | −2 | −3 |
| Fluid Resistance, 70 hrs @ RT in Fuel C | | | | | | | |
| Tensile, psi | 1754 | 2233 | 1928 | 2146 | 1885 | 1769 | 1667 |
| Elongation, % | 205 | 2335 | 175 | 170 | 230 | 155 | 250 |
| Mod @ 100%, psi | 580 | 638 | 725 | 957 | 580 | 870 | 435 |
| Hardness, pts | 50 | 53 | 55 | 58 | 47 | 59 | 60 |
| Volume Swell, % | 38 | 25 | 31 | 24 | 29 | 31 | 35 |
| Weight Change, % | 23 | 15 | 19 | 15 | 18 | 19 | 21 |
| Fluid Resistance, 70 hrs @ RT in 85% Fuel C/15% MeOH | | | | | | | |
| Tensile, psi | 1421 | 1406 | 1247 | 1653 | 1290 | 1174 | 1247 |
| Elongation, % | 185 | 165 | 135 | 135 | 195 | 115 | 190 |
| Mod @ 100%, psi | 536 | 594 | 768 | 1087 | 464 | 841 | 435 |
| Hardness, pts | 47 | 51 | 48 | 51 | 46 | 51 | 40 |
| Volume Swell, % | 49 | 52 | 55 | 51 | 53 | 31 | 81 |
| Weight Change, % | 29 | 31 | 33 | 32 | 33 | 12 | 57 |
| Fluid Resistance, 70 hrs @ RT in 75% Fuel C/25% MeOH | | | | | | | |
| Tensile, psi | 1406 | 1479 | 1464 | 1841 | 1232 | 1218 | 1232 |
| Elongation, % | 190 | 180 | 155 | 145 | 155 | 115 | 205 |
| Mod @ 100%, psi | 536 | 522 | 681 | 986 | 623 | 928 | 362 |
| Hardness, pts | 46 | 44 | 49 | 53 | 47 | 54 | 41 |
| Volume Swell, % | 45 | 45 | 47 | 48 | 59 | 59 | 62 |
| Weight Change, % | 26 | 27 | 28 | 29 | 37 | 36 | 38 |

[1] Zetpol ™ 1020 obtained from Nippon Zeon Company
[2] Therban C4550 obtained from Bayer
[3] N550
[4] N990
[5] HiSil ™ 243 obtained from PPG
[6] Plasthall ™ T0TM obtained from C P Hall
[7] Plasthall ™ C7050 obtained from C P Hall
[8] 4,4'di(dimethyl benzyl) diphenylamine
[9] Zinc mercaptoluimidazole
[10] Dynamar FX5166 obtained from 3M
[11] α bis(t-butylperoxy) diisopropyl benzene As mentioned herein, fuel hoses are commonly made of at least two layers of different materials, such as a barrier layer and a rubber layer. Therefore, adhesion of these two layers to each other is critical to commerciality. Another property that is important to fuel hose is weight loss due to extraction of hose material components or "bleeding." Amongst the numerous properties listed above, particular attention should be paid to the "Adhesion" data and "Bleeding" data. When a given sample indicates "mylar type," that is a characterization of the resulting surface between the layer of rubber and THV. Mylar-type implies poor adhesion and means the interfacial adhesion between the two layers was less than of the stock itself. "Stock tear" implies good adhesion and means the rubber tore rather than a clean separation between the layers.

Now looking at the above data, one sees that Samples 2, 4, 8, 12 and 14, all of which represent the present invention, did not bleed. In addition, one sees that Samples 2, 6, 10 and 14 had excellent adhesion properties. It should also be noted that Samples 2 and 14 represent a preferred embodiment and exhibited the combination of very desirable adhesion and non-bleeding properties.

What is claimed is:

1. A hose comprising
   (a) a rubber layer containing (1) hydrogenated acrylonitrile-butadiene rubber; (2) from 2 to 15 phr of an organophosphonium salt; (3) from 5 to 30 phr of trioctyl trimellitate; and (4) from 5 to 30 phr of a dialkyl diether glutarate; and
   (b) a barrier layer comprised of a terpolymer derived from tetrafluoroethylene, hexafluoropropylene and vinylidene fluoride, wherein said barrier layer is directly adhered to said rubber layer.

2. The hose of claim 1 wherein a rubber layer containing hydrogenated acrylonitrile-butadiene rubber is the innermost layer of the hose.

3. The hose of claim 2 wherein the inside diameter of the innermost layer ranges from 3 to 100 mm.

4. The hose of claim 3 wherein the diameter of the wall of the innermost layer ranges of from about 0.1 to 8.0 mm.

5. The hose of claim 1 wherein the barrier layer is the innermost layer of the hose.

6. The hose of claim 5 having an outer cover made of an elastomer material.

7. The hose of claim 6 wherein a first layer is disposed between said rubber layer and outer cover, said first layer being a rubber layer comprising (a) hydrogenated acrylonitrile-butadiene rubber; (b) from 4 to 8 phr of an organophosphonium salt; (c) from 7 to 15 phr of trioctyl trimellitate; and (d) from 7 to 15 phr of a dialkyl diether glutarate.

8. The hose of claim 5 wherein the inside diameter of the innermost layer ranges from 3 to 100 mm.

9. The hose of claim 1 wherein said organophosphonium salt is selected from the group consisting of quaternary phosphonium salts containing an alkyl group with 1 to 20 carbon atoms and organophosphonium salts containing an aromatic substituted group.

10. The hose of claim 1 wherein said hydrogenated acrylonitrile-butadiene rubber has a Mooney viscosity (M/L 1+4 @ 100° C.) ranging from 60 to 120.

11. The hose of claim 1 wherein said hydrogenated acrylonitrile-butadiene rubber has a bound acrylonitrile content ranging from 20 to 45 percent.

12. The hose of claim 1 wherein said dialkyl diether glutarates are of the formula

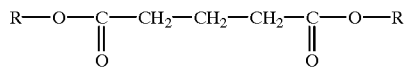

wherein R is selected from the group consisting of alkyl ether groups containing from 8 to 18 carbon atoms.

13. The hose of claim 1 wherein said hose has an outer cover made of a material selected from the group consisting of (a) elastomeric materials and (b) reinforcement material.

14. The hose of claim 13 having an outer cover made of an elastomeric material.

15. The hose of claim 14 wherein a first layer is disposed between said barrier layer and outer cover, said first layer being a rubber layer comprising (a) hydrogenated acrylonitrile-butadiene rubber; (b) from 4 to 8 phr of an organophosphonium salt; (c) from 7 to 15 phr of trioctyl trimellitate; and (d) from 7 to 15 phr of a dialkyl diether glutarate.

16. The hose of claim 15 wherein a layer of tensioned reinforcement strands is disposed between said first layer and said elastomeric cover.

17. The hose of claim 13 having an outer cover made of a reinforcement material selected from the group consisting of spiraled yarn, knitted yarn and braided yarn.

18. The hose of claim 17 wherein said reinforcement material is from textile yarns of polyester, nylon, rayon and aramid.

19. The hose of claim 13 wherein said elastomer that comprises said outer cover is selected from the group consisting of chlorosulfonated polyethylene, chlorinated polyethylene, acrylonitrile-butadiene rubber/PVC blends, epichlorohydrin, EPDM, chloroprene, EVA, ethylene acrylic elastomer and EVM.

20. The hose of claim 13 wherein the thickness of the outer cover made of elastomeric materials ranges from about 0.1 to 10 mm.

21. The hose of claim 1 wherein the thickness of the barrier layer ranges of from 0.02 to 0.76 mm.

22. The hose of claim 1 wherein a carbon black is present in said rubber layer in an amount ranging from 5 to 200 phr.

23. The hose of claim 22 wherein said carbon black has a particle size of from 30 to 500 nm.

24. The hose of claim 23 wherein said carbon black has a particle size of from 200 to 500 rim.

25. The hose of claim 1 wherein there is no silica present in the rubber layer.

26. The hose of claim 1 wherein there is no magnesium oxide in the rubber layer.

* * * * *